Nov. 5, 1946.  A. L. SEGELHORST  2,410,589
AUTOMATIC SLIP MECHANISM
Filed Aug. 17, 1942  3 Sheets-Sheet 1
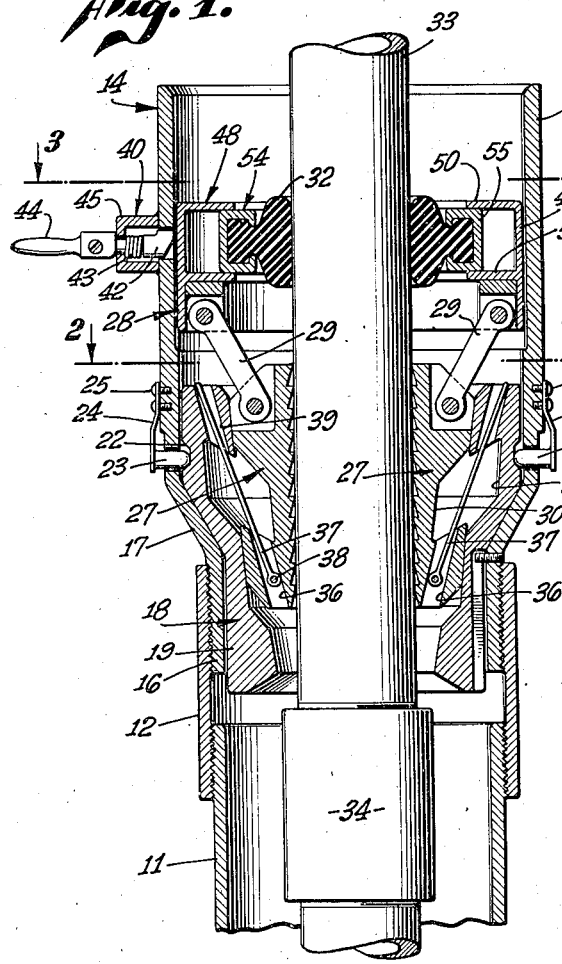
Fig. 1.
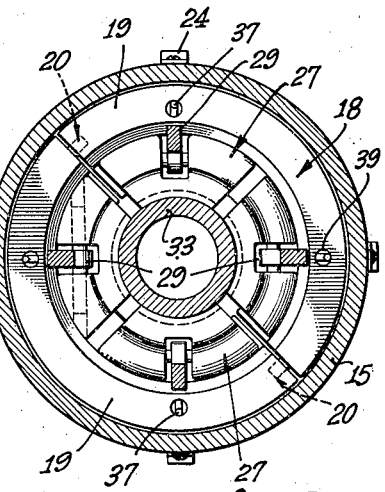
Fig. 2.
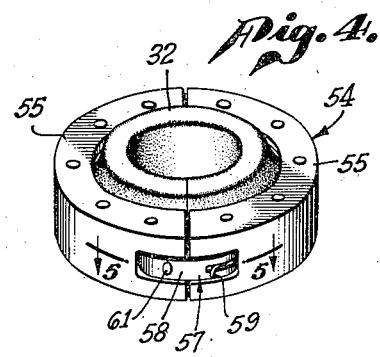
Fig. 4.
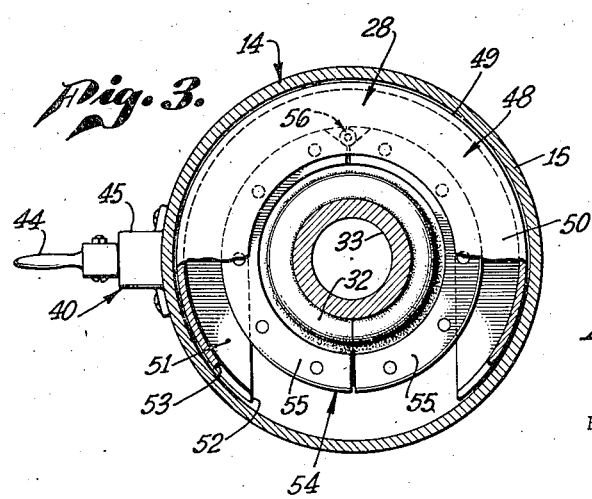
Fig. 3.
Fig. 5.
AUGUST L. SEGELHORST,
INVENTOR.
BY Frank L. A. Graham
ATTORNEY.

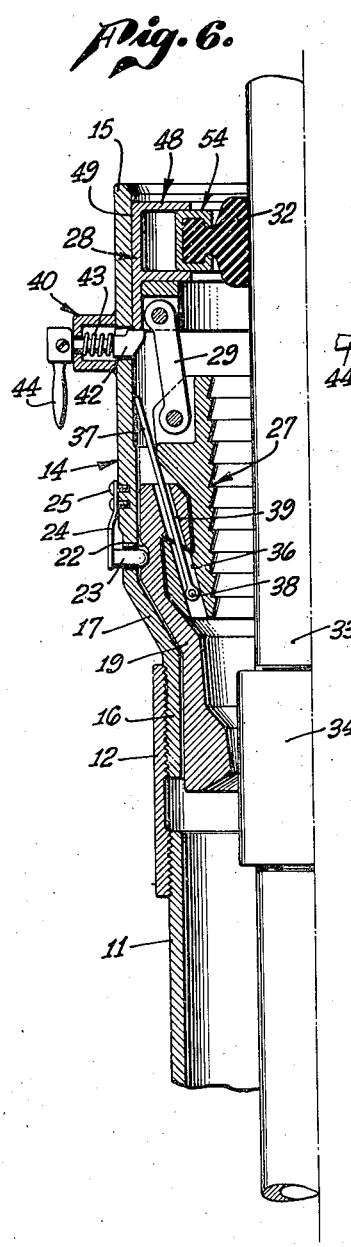
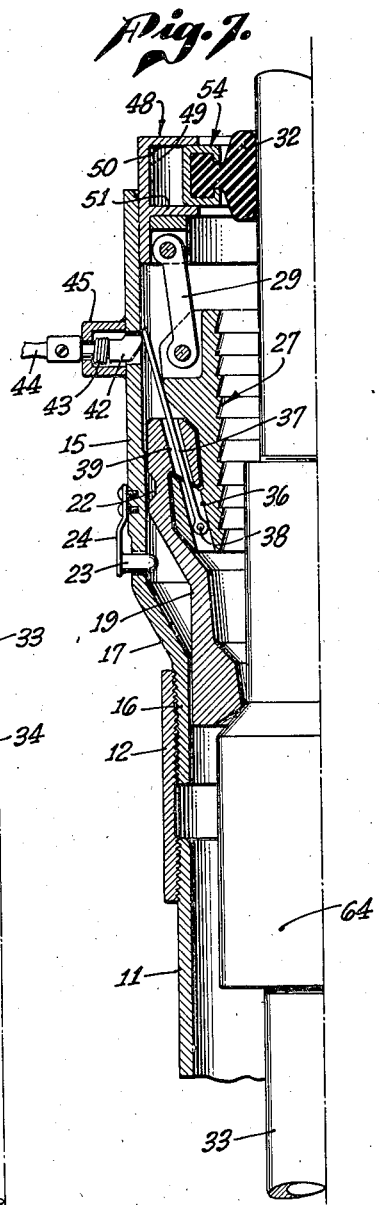
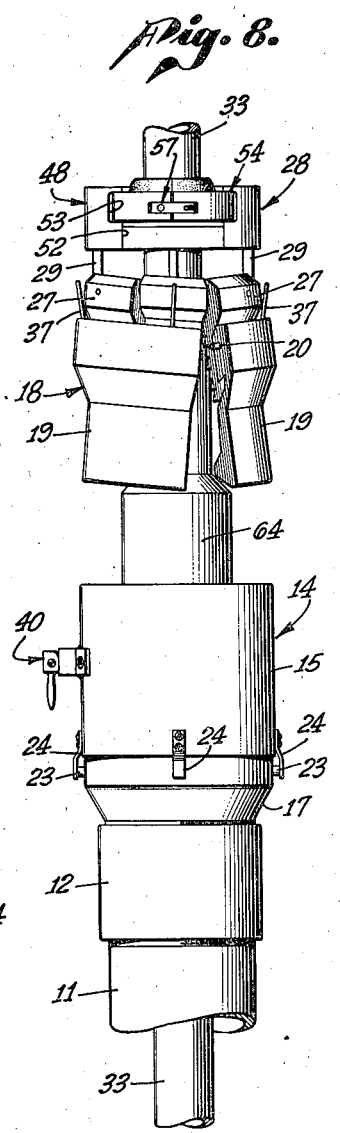
AUGUST L. SEGELHORST,
INVENTOR.
BY
ATTORNEY.

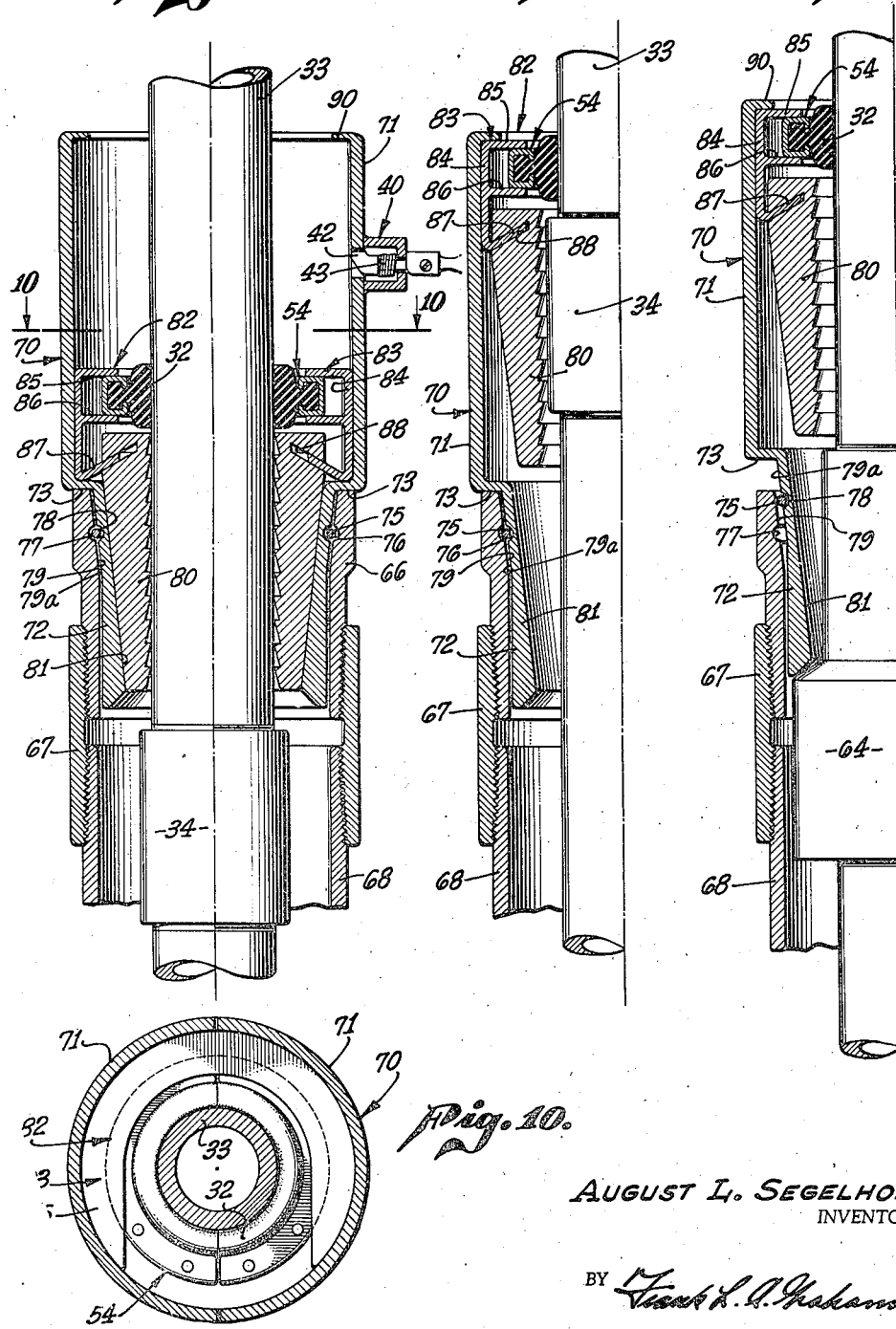

Patented Nov. 5, 1946

2,410,589

UNITED STATES PATENT OFFICE 2,410,589

AUTOMATIC SLIP MECHANISM

August L. Segelhorst, Taft, Calif.

Application August 17, 1942, Serial No. 455,049

16 Claims. (Cl. 166—14)

This invention relates to means for supporting pipe and tubing in a well in the drilling and operating of oil wells, such means usually including the use of slips removably mounted in a slip bowl or housing for gripping and suspending the pipe.

It is an object of this invention to provide means for suspending pipe in a well including automatically operable slip means which constitutes an improvement over the various forms of automatic slip handlers disclosed in my earlier Patent No. 1,868,119, issued July 19, 1932. In that earlier patent the suspension means shown is only capable of passing objects or parts having a diameter or radial extent of a limited amount greater than the diameter of the tubing or pipe adapted to be suspended, the apparatus being designed for the retraction of the slips sufficiently to permit the passage of pipe or tubing joints or tubing collars. It is a principal object of this invention to provide an automatic slip suspension means which is designed to pass larger objects than the ordinary enlarged tubing joints or the like. In this connection it is a particular object of my invention to provide a means whereby the member in which the slips are mounted can be detachably secured in the housing element of the pipe means and is subject to being detached from such housing and removed therefrom by a sufficiently strong upward force acting against the member.

It is also an object to provide a new and improved type of slip control ring for engaging the pipe extending through the pipe suspension means for use in automatically retracting the slips. These and other objects will be apparent from the drawings and the following description:

Referring to the drawings, which are for illustrative purposes only,

Fig. 1 is a sectional elevation through a pipe suspension means embodying the invention, such means being mounted on a well casing and being shown in conjunction with a suspended pipe;

Fig. 2 is a sectional plan view on line 2—2 of Fig. 1;

Fig. 3 is a sectional plan view on line 3—3 of Fig. 1;

Fig. 4 is a perspective view of the pipe engaging ring of the slip control member;

Fig. 5 is a fragmentary sectional plan view taken on line 5—5 of Fig. 4;

Fig. 6 is a sectional elevation of one-half of the apparatus shown in Fig. 1 with the slips and slip ring shown elevated and the slips retracted;

Fig. 7 is a view similar to Fig. 6 but with the slip control ring, slips and slip bowl shown being forced out of the housing;

Fig. 8 is an elevation showing the slip control ring, slips and slip bowl suspended on a pipe above the housing as it would appear with the pipe further elevated;

Fig. 9 is a sectional elevation of apparatus embodying another form of the invention;

Fig. 10 is a sectional plan view on line 10—10 of Fig. 9;

Fig. 11 is a sectional elevation of half of the apparatus shown in Fig. 9 with the slip control ring and slips in elevated positions; and Fig. 12 is a view similar to Fig. 11 but showing the slip bowl being forced out of the housing.

More particularly describing the invention, the well pipe suspension means has been shown attached to the upper end of a well casing 11 by means of a collar 12 connecting the casing and what will be termed the housing 14. The housing has an upper substantially cylindrical portion 15 and a lower cylindrical portion 16 connected by a converging, or inwardly tapering intermediate portion 17. The form of the apparatus shown is designed to be screwed into a collar, however, I contemplate that various means may be provided on the housing for attaching it to the well casing.

The housing is adapted to accommodate what will be termed a slip bowl 18 which, in the form shown, comprises two semi-annular members 19 adapted to seat on the inner surface of the converging portion 17 of the housing. These members may be provided with interfitting pin and recess means shown at 20.

The slip bowl is detachably secured in the housing so that a predetermined upward force acting upon it is required to dislodge it. The means shown for detachably securing the slip bowl in place includes an annular recess 22 in the outer surface of the slip bowl. Pins 23, extending through the housing and mounted on the spring elements 24, are yieldably urged into the recess in the bowl. The spring elements 24 can be secured to the housing in any suitable way as by the screw 25. The recess 22 and the ends of the pins 23 are tapered so that the slip bowl can be readily seated in the housing and so that it can be unseated from the housing by a predetermined force tending to move it upwardly in the housing.

With this construction the slip bowl can be moved out of the housing by any enlargement on the pipe as when the pipe is being raised through the pipe supporting means and such enlargement is of a greater diameter than can be accommodated by the most restricted portion of the bore through the slip bowl. The function and mode of operation of the slip bowl will be explained subsequently following a description of the associated apparatus.

The slip bowl is adapted to accommodate slip members 27, preferably four in number. These slip members are designed to be automatically retracted and for this purpose are flexibly connected to an annular slip control member 28 by means of individual links 29 pivotally connected at the upper ends of the slips and to the slip control member.

In the form of the invention illustrated in Figs. 1 to 8 the slips and the slip bowl are shown provided with transverse recesses 30 and 31 respectively. With this construction the slips can be elevated and at the same time retracted by reason of the fact that the lower end portions of the slips are receivable in the recesses 31 of the slip bowl while the upper end portion of the slip bowl is receivable in the recess 30 in the slips as shown clearly in Figs. 6 and 7. The slips are moved to an elevated and retracted position through the medium of the slip actuating or control member 28 which includes a split annular yieldable pipe engaging member 32 adapted to yieldably engage a pipe 33 extending through the pipe suspension means. When the pipe 33 is elevated relative to its position of Fig. 1, the slip control member 28 moves upwardly carrying the slips with it to the position in which the parts are shown in Fig. 6.

With the particular construction of Fig. 1 it is desirable to have a means for guiding the lower ends of the slips into the recess 31 in the bowl so that the inner faces of the slips will be maintained substantially vertical and thereby permit of the ready passage of a tubing collar such as 34. To accomplish this the lower ends of the slips are provided with openings or passages 36 each of which accommodates a guide rod 37 pivotally secured therein by a pin 38. These guide rods are received in angular passages or openings 39 in the upper end portion of the slip bowl so that when the slips are elevated the guide rods move through passages 39 and by reason of the angular disposition of these passages the lower ends of the slips are guided into the recess 31 in the slip bowl.

It is often desirable to lock the slips in the elevated or retracted position and to accomplish this a latch means, indicated by 40, is provided in the upper part of the housing at a position where the bolt thereof will fit under the lower end of the slip control member 28 when the member and slips are elevated such as indicated in Fig. 6. The latch may be of any suitable form but has been shown as a plunger 42 urged inwardly by spring 43 and provided at its outer end with a pivoted handle 44 having cam surfaces thereon adapted to engage the latch housing extension 45 so that the handle can operate and hold the plunger retracted or extended as indicated respectively in Figs. 1 and 6.

The slip actuating or control member 28 itself, as indicated in Figs. 1, 3, 4 and 5, comprises an outer ring 48 having a cylindrical wall portion 49 adapted to be slidably received in the upper end of the housing. A pair of flanges 50 and 51 extend inwardly of the wall 49 in spaced parallel relation and at right angles to the axis of the well pipe supporting means. These flanges and the outer wall 49 of the slip control member 28 for a channel arcuate in shape being interrupted to provide a gap 52 between the flanges and a gap 53 between the ends of the wall 49. With this construction an inner floating ring 54 can be inserted into the space between the flanges 50 and 51 and of course be retained in position when the apparatus is within the housing. The inner ring 54 itself comprises a pair of channel members 55 hingedly connected at one side at 56 and latched together by the fastening means 57. This fastening means may be of any desired form but in the construction shown comprises a hooked pivotally mounted latch member 58 yieldably urged by spring 59 to the position in which it is shown in Fig. 5 hooked about the pin 60. An auxiliary pin 61 is provided extending through the member 58 and into the flexible and resilient slip ring 32 which serves as a yieldable pipe engaging member. This pipe engaging member 32 is fitted within the ring 54 and should be of split construction so that it and the ring may be assembled about a pipe 33 and the like and subsequently removed therefrom as occasion demands.

With the construction outlined the housing 14 can be rigidly mounted at the upper end of the well casing and the slip bowl 18 inserted and latched therein. The slip control member 28 and slips 27 can be assembled about the pipe 33 or they can be sent out by a supply house or the like already assembled about a short length of pipe which can be placed into the tubing string or drill pipe at the well. As the pipe is lowered through the housing the slip control member 28 and slips will be moved into the position in which they are shown in Fig. 1. In order to further lower the pipe the slips can be retracted by elevating the pipe a distance sufficient to elevate the slip control member 28 and slips to the position in which they are shown in Fig. 6. The latch 40 can then be utilized to lock the parts in this position and the pipe can be lowered through the supporting means. At any desirable time the slips can be dropped into lowered position to suspend the pipe by tripping the latch.

As the pipe is removed from the well it often happens that there is a large object attached to the pipe such as a tubing catcher or tool such as the large projection 64 shown in Fig. 7. For purposes of illustration the part 64 is shown merely as an enlargement on the pipe and it is intended that this should diagrammatically indicate any tool, tubing catcher or the like as may be suspended on the pipe. The part 64 is of too large diameter to pass through the bore of the slip bowl and consequently as the pipe is raised it hits the lower end of the bowl and if the force is sufficient the slip bowl is unseated or forced out of attached relation with the housing, the pins 23 being moved outwardly by the interengaging cam faces of the pins in the bowl. The slip bowl, slips and slip control member 28 can then be carried out of the housing and will be suspended from the pipe as indicated in Fig. 8. The slip control member, slips and slip bowl can then be removed from the pipe or left thereon as desired by the operator. These parts also may be reassembled on the pipe below the large object so that the withdrawal of tubing can be continued.

In Figs. 9 to 12 there is shown apparatus embodying another form of the invention. The apparatus comprises a housing member 66 provided with screw threads at its lower end so that it can be screwed into a collar 67 at the upper end of a casing 68. I contemplate that other means may be utilized for attaching the member 66 to the well casing such as the common flange and bolt construction.

The housing 66 is adapted to accommodate an elongated slip bowl or container 70 which has a cylindrical upper portion 71 and a reduced lower portion 72, these portions being separated by a shoulder 73 adapted to rest on top of the member 66. The slip bowl 70 is made in two parts or in halves so that it can be removed when desired. It is designed to be detachably secured in the housing so that under ordinary conditions it will remain in place, but will be dislodged by a force exceeding a predetermined amount so that larger elements than can be accommodated by the bore of the slip bowl can be elevated through the housing 66. In this form of the invention the means for detachably securing the parts together includes a split ring 75 which, when the parts are together, lies within an annular passage 76 formed by the oppositely disposed recesses 77 and 78 in the housing and bowl respectively. Immediately above and below the recesses the housing and bowl are provided with correspondingly tapered surfaces 79 and 79a so that the parts may be forced together and apart.

The slip bowl 70 is adapted to accommodate slips 80 which fit within the lower portion 72 of the bowl and are forced into engagement with the pipe 33 by the inwardly tapered surface 81 causing a wedging action. These slips are adapted to be automatically retracted by an annular slip control member generally designated by the numeral 82 which is slidably received in the upper portion 71 of the bowl. This slip control member 82 has an inner ring, generally indicated by numeral 54, which is the same as that disclosed in Figs. 1, 3, 4 and 5 and heretofore described. The control member 82 includes what may be termed an outer ring 83 having a wall 84 provided with three internal flanges. The two upper flanges 85 and 86 are spaced and extend inwardly at right angles to the axis of the suspension means and are adapted to accommodate the inner ring 54. These flanges are cut out at one side in a manner similar to the flanges 50 and 51 of the ring 48 of Fig. 1. The lower flange 87 extends inwardly and upwardly forming an acute angle with the inner surface of the wall 84. This flange is also semi-annular, being provided with a cut out portion or gap at one side corresponding to the flanges 85 and 86.

In this form of the invention the slips are directly suspended from the outer ring 83 by means of this flange 87 which is adapted to be received in correspondingly angled recesses 88 in the slip members. With this construction, as the pipe moves upwardly from the position shown in Fig. 9 to that of Fig. 10 for example, the slips naturally retract under the influence of gravity on the supporting flange 87. The co-fitting flange and recess construction also acts as a guide to maintain the slips in a vertical position. The upper end of the slip bowl 70 is provided with an inwardly extending flange 90 to limit upward movement of the slip control member and associated slips.

The operation of this form of the invention is substantially the same as that of the apparatus heretofore described, the action being briefly that when the pipe 33 is moved upwardly the slip control member 82 carries the slips upwardly and they automatically retract so that couplings 34 may be passed through. The slips and control member may be locked in the upward position by a suitable latch 40. If it is necessary to remove any objects of large diameter such as that indicated at 64 this can be done by exercising sufficient upward force against the lower end of the bowl to cause it to be forced out of latching relation with the housing as indicated in Fig. 11. In this connection the apparatus should be constructed so that a greater force is required to release the slip bowl from the housing than will be exerted by the pipe moving upwardly through the pipe engaging member of the slip control member.

Although I have described and illustrated certain constructions or embodiments which the invention can take I contemplate that various changes and modifications can be made without departing from the scope of the invention and I intend to cover such changes and modifications as come within the claims.

I claim as my invention:

1. In a well pipe supporting means: a housing; a segmental slip bowl seated in said housing; yieldable means mounted on said housing releasably securing said bowl in said housing, said yieldable means being adapted to be overcome by a predetermined upward force on said bowl; and slips downwardly slidably receivable in said bowl to engage and support against downward movement a pipe extending through the bowl.

2. In a well pipe supporting means; a housing adapted to be mounted on a well casing, said housing having a lower portion with a frustroconical bore and a cylindrical upper portion; a segmental slip bowl seated in the lower portion of said housing; latch means mounted on said housing for releasably securing said bowl in said housing; a slip control member slidably mounted in the upper portion of said housing having a floating yieldable member adapted to frictionally engage a pipe extending through said pipe supporting means; and slips suspended from said control member normally seated in said bowl to engage and support said pipe against downward movement relative to the bowl, said slip control member being movable upwardly by virtue of upward movement of said pipe whereby to disengage the slips from the pipe.

3. In a well pipe supporting means: a housing adapted to be mounted on a well casing; a segmental slip bowl seated in said housing, said bowl having a lower portion with a frustro-conical bore and having a cylindrical upper portion; latch means for releasably securing said bowl in said housing; a slip control member slidably mounted in the upper portion of said slip bowl having a yieldable member adapted to frictionally engage a pipe extending through said pipe supporting means; and slips suspended from said slip control member normally seated in the lower portion of said bowl to engage and support said pipe against downward movement relative thereto.

4. In a well pipe supporting means: a housing adapted to be mounted on a well casing; a segmental slip bowl seated in said housing, said bowl having a lower portion with a frustro-conical bore and having a cylindrical upper portion; means for releasably securing said bowl in said housing; a slip control member slidably mounted in the upper portion of said slip bowl having a yieldable member adapted to frictionally engage pipe extending through said pipe supporting means; slips suspended from said slip control member normally seated in the lower portion of said bowl to engage and support said pipe against downward movement relative thereto; and means for releasably locking said slip control member against downward movement.

5. For use in a slip bowl having a lower portion with a frustro-conical bore and a cylindrical upper portion, a slip control ring member having a cylindrical wall provided with three internal flanges, the upper flange and intermediate flange being parallel and at right angles to the cylindrical wall and the lower flange forming an acute angle with the inner side of the cylindrical wall, said control ring being interrupted at one side forming a gap of sufficient size to receive an annular pipe engaging member; an annular pipe engaging member in said control ring between the parallel flanges; and slips provided with recesses at their upper ends to accommodate the lower flange of said slip control ring, said slips being suspended from said lower flange.

6. For use in a slip bowl having a lower portion with a tapered bore and a cylindrical upper portion; a slip control ring member having a cylindrical wall provided with three internal flanges, the upper flange and intermediate flange being parallel and at right angles to the cylindrical wall and the lower flange forming an acute angle with the inner side of the cylindrical wall, said control ring being interrupted at one side forming a gap of sufficient size to receive an annular pipe engaging member; an annular pipe engaging member in said control ring comprising a rigid openable channel member and a split resilient ring therein; and slips having recesses in their upper ends to accommodate the lower flange of said slip control ring, said slip being suspended from said lower flange.

7. A slip control ring for use as described comprising an outer interrupted ring having a cylindrical wall portion and three internal semi-annular flanges, said lower flange forming an acute angle with the inside of the cylindrical wall portion and the other two flanges being parallel and at right angles to said cylindrical wall portion; and a split inner ring receivable between the parallel flanges of the outer ring and having a flexible portion adapted to engage a pipe extending therethrough.

8. In a well pipe supporting means: a housing adapted to be mounted on a well casing; a segmental slip bowl receivable in said housing, said housing and said bowl being provided with registering annular recesses in their adjacent faces forming an annular space when the parts are together; a split ring in said space adapted to detachably secure the parts together and requiring a predetermined upward force on said slip bowl to detach the parts; and slips movably mounted in said housing to engage and support against downward movement relative thereto a pipe extending through said housing.

9. In a well pipe supporting means: a housing adapted to be mounted on a well casing; a segmental slip bowl seated in said housing, said bowl having a cylindrical upper portion and a lower portion with a tapered bore, said housing and said bowl being provided with registering annular recesses in their adjacent faces forming an annular space when the parts are together, a split ring in said space adapted to detachably secure the parts together and requiring a predetermined upward force on said slip bowl to detach the parts; a slip control ring slidably mounted in the upper portion of said slip bowl having a yieldable member adapted to engage a pipe extending through said pipe supporting means; and slips suspended from said ring normally seated in the lower portion of said bowl to engage and support said pipe against downward movement relative to the bowl.

10. In a well pipe supporting means: a housing adapted to be mounted at the upper end of a well casing; a segmental slip bowl received in said housing; slips slidably received in said bowl to engage and support a pipe extending through the housing against downward movement relative thereto, said slips and said bowl being provided upon their engaging faces with transverse recesses producing interfitting parts whereby the slips are adapted to move radially outward when elevated to clear the couplings on a pipe extending through the supporting means; an annular slip control member slidably mounted in said housing and connected to said slips, said annular slip control member being adapted for frictional engagement with said pipe and being movable upwardly relative to the bowl by upward movement of the pipe whereby to disengage the slips from the pipe; and yieldable means mounted on said housing for releasably securing said bowl in said housing whereby a predetermined upward force is required to move said bowl, said bowl and slips being adapted to be carried out of said housing by an upwardly moving member bearing against the lower end of the slip bowl with sufficient force to overcome the means for releasably securing the bowl in the housing.

11. In a well pipe supporting means, a housing; a segmental slip bowl seated in said housing; yieldable means mounted on said housing releasably securing said bowl in said housing, said yieldable means being adapted to be overcome by a predetermined upward force on said bowl; slips slidably receivable in said bowl to engage and support a pipe extending through the housing against downward movement relative thereto; and an annular slip control member slidably mounted in said housing and connected to said slips, said annular slip control member being adapted for frictional engagement with said pipe and being movable upwardly relative to the bowl by upward movement of the pipe whereby to disengage the slips from the pipe.

12. In a well pipe supporting means: a housing adapted to be mounted on a well casing; a segmental bowl seated in said housing; slips slidably received in said bowl to engage and support a pipe extending through the housing against downward movement relative thereto, said slips and said bowl being provided with transverse recesses upon their engaging faces providing interfitting parts whereby the slips are adapted to move radially outward when elevated to clear the couplings on a pipe extending through the supporting means; a slip control member slidably mounted in said housing having a yieldable portion adapted to frictionally engage a pipe extending through the well pipe supporting means and being movable upwardly relative to the bowl by upward movement of said pipe whereby to disengage the slips from the pipe; means connecting said slips to said slip control member; and latch means mounted on said housing for releasably securing said bowl in said housing, said latch means being adapted to be overcome by a predetermined upward force on said bowl in excess of the upward force exertable upon said bowl by upward movement of a pipe extending through said well pipe supporting means through the medium of said slip control member and said slips.

13. In a well pipe supporting means: a housing adapted to be mounted on a well casing; a segmental bowl seated in said housing; slips slidably received in said bowl to engage and support a pipe extending through the housing against downward movement relative thereto, said slips and said bowl being provided with transverse recesses upon their engaging faces providing interfitting parts whereby the slips are adapted to move radially outward when elevated to clear the couplings on a pipe extending through the supporting means; a slip control member slidably mounted in said housing having a yieldable portion adapted to frictionally engage a pipe extending through the well pipe supporting means and being movable upwardly relative to the bowl by upward movement of said pipe whereby to disengage the slips from the pipe; links connecting said slips to said slip control member; guide means slidably received in the upper part of said bowl and connected to the lower ends of the individual slips for holding the slips substantially vertical when elevated; and latch means mounted on said housing for releasably securing said bowl in said housing, said latch means being adapted to be overcome by a predetermined upward force on said bowl in excess of the upward force exertable upon said bowl by upward movement of a pipe extending through said well pipe supporting means through the medium of said slip control member and said slips.

14. In a well pipe supporting means: a housing adapted to be mounted on a well casing; a segmental bowl seated in said housing; slips slidably received in said bowl to engage and support a pipe extending through the housing against downward movement relative thereto, said slips and said bowl being provided with transverse recesses upon their engaging faces providing interfitting parts whereby the slips are adapted to move radially outward when elevated to clear the couplings on a pipe extending through the supporting means; a slip control member having a yieldable portion adapted to frictionally engage a pipe extending through the well pipe supporting means and being movable upwardly relative to the bowl by upward movement of said pipe whereby to disengage the slips from the pipe; means connecting said slips to said control member; latch means mounted on said housing engageable with the slip control member for locking said slips against downward movement when elevated; and yieldable means mounted on said housing engageable with said bowl for releasably securing said bowl in said housing, said yieldable means being adapted to be overcome by a predetermined upward force on said bowl in excess of the upward force exertable upon said bowl by upward movement of a pipe extending through said well pipe supporting means through the medium of said slip control member and said slips.

15. In a well pipe supporting means: a housing adapted to be mounted on a well casing; a segmental slip bowl seated in said housing; slips slidably receivable in said bowl to engage and support a pipe extending through the housing against downward movement relative thereto; pipe engaging means connected with said slips and slidably mounted in said housing, said pipe-engaging means being frictionally engageable with and upwardly movable by a pipe extending through said well pipe supporting means for disengaging the slips from the pipe upon upward movement of said pipe relative to said slip bowl said bowl having a recess in its outer surface; pins mounted in said housing and projecting into said recess; and yieldable means urging said pins into said recess, said pins and said recess being formed to permit disengagement of the parts by a force of predetermined amount tending to move said bowl out of said housing.

16. In a well pipe supporting device having slips mounted for movement axially of a pipe into and out of locking engagement therewith and a pipe-encircling slip-actuating member connected to said slips and having an arcuate channel; means adapted to frictionally secure said slip-actuating member to a pipe, comprising a split, yieldable annular member for engagement with the pipe, a sectional ring forming a channel to receive the yieldable annular member throughout a portion of its thickness radially inwardly from its periphery, and latching means on said sectional ring for detachably securing the sections thereof together about the yieldable annular member.

AUGUST L. SEGELHORST.